United States Patent
Lee et al.

(10) Patent No.: US 9,368,009 B2
(45) Date of Patent: Jun. 14, 2016

(54) HOME AUTOMATION SYSTEM MONITORED BY SECURITY SYSTEM

(71) Applicant: Honeywell International Inc., Morristown, NJ (US)

(72) Inventors: Albert Lee, Brooklyn, NY (US); Dan Tyroler, Great Neck, NY (US); Hong-Jyh Chen, Woodbury, NY (US); Howard Yuk, East Meadow, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 127 days.

(21) Appl. No.: 14/166,077

(22) Filed: Jan. 28, 2014

(65) Prior Publication Data
US 2015/0213696 A1    Jul. 30, 2015

(51) Int. Cl.
G08B 21/00 (2006.01)
G08B 13/22 (2006.01)
G08B 25/10 (2006.01)
G08B 21/18 (2006.01)
H04L 12/28 (2006.01)

(52) U.S. Cl.
CPC ............... *G08B 13/22* (2013.01); *G08B 21/18* (2013.01); *G08B 25/10* (2013.01); *H04L 12/2803* (2013.01); *H04L 12/2829* (2013.01)

(58) Field of Classification Search
CPC ...... G08B 13/00; G08B 25/10; G05B 19/042; H04L 12/282

USPC ......... 340/522, 531, 533, 539.1, 539.14, 541, 340/506, 511; 709/218, 223, 224
See application file for complete search history.

(56) References Cited

U.S. PATENT DOCUMENTS

| | | | |
|---|---|---|---|
| 3,710,317 A * | 1/1973 | Colsen et al. | 340/428 |
| 6,297,724 B1 | 10/2001 | Bryans et al. | |
| 6,441,723 B1 * | 8/2002 | Mansfield et al. | 340/538.11 |
| 6,977,585 B2 * | 12/2005 | Falk et al. | 340/506 |
| 7,119,675 B2 * | 10/2006 | Khandelwal et al. | 340/531 |
| 7,349,682 B1 * | 3/2008 | Bennett et al. | 455/403 |
| 8,368,509 B2 * | 2/2013 | Fitzgibbon et al. | 340/5.71 |
| 2006/0220830 A1 * | 10/2006 | Bennett et al. | 340/506 |
| 2009/0315699 A1 * | 12/2009 | Satish et al. | 340/533 |
| 2012/0319840 A1 * | 12/2012 | Amis | 340/540 |

FOREIGN PATENT DOCUMENTS

WO   WO 2008/004251 A2   1/2008

OTHER PUBLICATIONS

Extended European search report from corresponding EP application 15151664.8, dated Jun. 18, 2015.

* cited by examiner

*Primary Examiner* — Mark Rushing
(74) *Attorney, Agent, or Firm* — Husch Blackwell LLP

(57) ABSTRACT

A system is provided, where the system includes at least one security system sensor, at least one home automation device and a security system processor that monitors the security system sensor and generates an alarm upon activation of the at least one security system sensor. The security system processor also monitors the at least one home automation device and generates an alarm upon detecting the manual activation of the at least one home automation device.

15 Claims, 1 Drawing Sheet

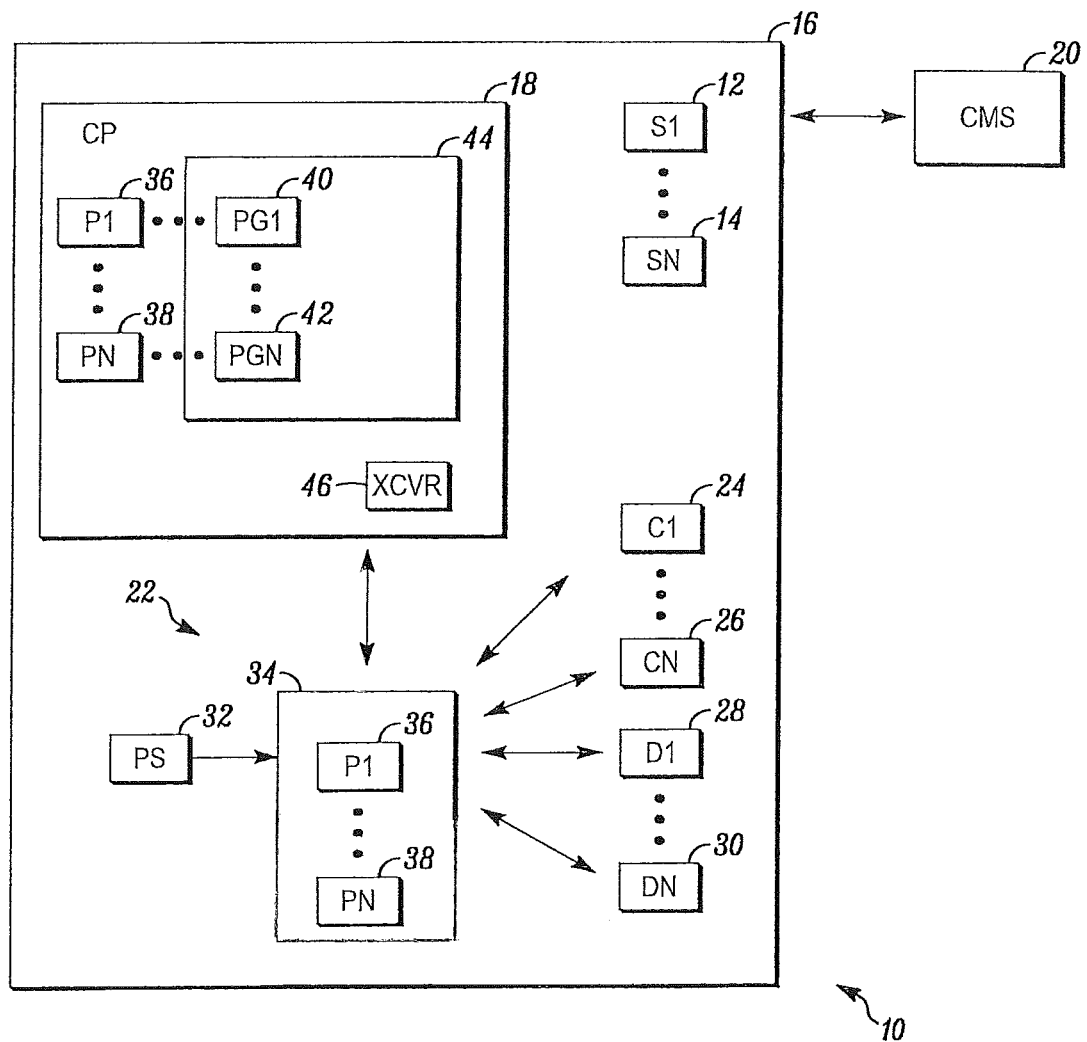

HOME AUTOMATION SYSTEM MONITORED BY SECURITY SYSTEM

FIELD

The application pertains to security systems and more particularly to security systems used in conjunction with home automation systems.

BACKGROUND

Systems are known that monitor for threats to safety and/or security in secured areas. Threats to safety and/or security may arise from unauthorized intruders or from environmental threats such as fire and/or hazardous gases.

Such systems typically include a number of sensors distributed around a periphery of the area or throughout the area. For example, security systems intended to detect intruders may include a number of detectors distributed along a periphery of the area and at each opening into the secured area. In this situation, the sensors may be limit switches connected to each door or window that detect opening of the associated door or window. In this type of security system, the sensors may be connected to a control panel that sounds a local alarm upon activation of any of the sensors.

Other security systems may include sensors distributed throughout the protected area including sensors that detect entry into the secured area via the opening of doors and windows and also sensors that indirectly detect the presence of intruders. Indirect detection may include the use of passive infrared (PIR) detectors or television cameras that detect intruders via changes among successive images from the camera. In addition to intrusion detection devices, such security systems may also often include one or more environmental sensors (e.g., fire, carbon monoxide, etc.).

Security systems typically operate in a number of modes including an armed and disarmed state and often a number of sub-states including armed away and armed stay states. In the armed away state all sensors within the secured area may be monitored. In the armed stay state only the intrusion sensors on the periphery of the secured area may be monitored. Any environmental sensor within the secured may be monitored in all states. While existing systems work well, a need exists for better methods of integrating the various sensors that may be present within secured areas.

BRIEF DESCRIPTION OF THE DRAWINGS

FIG. 1 illustrates a block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the security system may be a number of sensors 12, 14 that monitor a secured area 16 for threats to safety and/or security. For example, at least some of the sensors may be embodied as limit switches on doors and/or windows providing access into the secured area. Other sensors may be passive infrared (PIR) sensors or cameras with motion detection capabilities.

The sensors may also include one or more environmental sensors. The environmental sensors may be embodied as smoke detectors, carbon monoxide detectors, natural gas or toxic gas sensors, etc.

Also included within the security system is a control panel 18. In this regard, the control panel may monitor a status of each of the sensors. Upon detecting activation of one of the sensors, the control panel may send an alarm message to a central monitoring station 20.

A home automation system 22 is also shown located within the secured area. The home automation system 22 may be a separate device as shown in FIG. 1 or may be integrated into the control panel of the security system.

The home automation system functions to control operating features of one or more controlled devices 28, 30 based upon a signal from one or more user controlled input devices (e.g. a pushbutton) 24, 26. In this regard, each of the input devices may be a wired or wireless device that is manually activated by a human user and that, in turn, generates control signals that control of a respective output device through operation of a controller 34.

In one particular example, the home automation system may include one input device (e.g., 24) that is used to control a light fixture (e.g., 28). In this case, activation of the input device a first time causes the controller 34 to activate the light fixture by switching power from a power source 32 to the fixture. Activating the input device a second time may cause the controller to interrupt the flow of power to the fixture.

In another example, the home automation system may include at least one input device (e.g., 26) that controls operation of a home stereo audio system (e.g., 30). In this case, the input device may include one or more input buttons that control, respectively, activation of the stereo system, volume, a tuning frequency of an AM/FM receiver, etc.

Located within the control panel, each of the sensors, the home controller, each of the user controlled input devices and controlled (output) devices may be control circuitry that accomplishes the functionality of those devices. For example, the control circuitry may include one or more processor apparatus 36, 38 that each operate under control of one or more computer programs 40, 42 loaded from a non-transitory computer readable medium (memory) 44. As used herein, reference to a step performed by a computer program is also reference to the processor that executed that step.

In the case where the control panel 18 communicates with the sensors under a wireless format, the control panel and sensors may each include a corresponding wireless transceiver 46. Similarly, where the controller 34 communicates with the control input devices and controlled devices under a wireless format, the controller, the input devices and controlled devices may each also include a corresponding wireless transceiver 46.

Under the illustrated embodiment, the home automation system provides status messages to the security system that notifies the security system of activity within the home automation system. This is important because any activation of an input device while the security system is in an armed mode could also indicate the presence of an intruder.

In general, the home automation system 22 can be based upon any technology (e.g., Z-wave, ZigBee, UPB, X10, etc.) that sends state change messages to the security system or that can be polled for state changes. While the home automation system of FIG. 1 is shown to include a central controller 34, the central controller 34 could be integrated with an input device or controlled device. In addition, the home automation system of FIG. 1 could include a number of separate home automation systems 22 that each independently report status messages to the security system.

During normal operation, the security system may process inputs from the home automation system in the same manner as inputs from any of the sensors of the security system. In this regard, an alarm processor of the security system may logically AND an input from a sensor with the status of the alarm system. For example, if the security system is in the alarm away mode, then the alarm away is ANDed with an input from one of the sensors. If both are true (i.e., the system is in an armed away mode and a sensor is activated), then the security system sends an alarm message to the central monitoring station.

Similarly, the alarm processor may logically AND the alarm away state with a manual input from any of the input devices 24, 26. Stated in another way, if the security system is in the armed state and a status message is received from the home automation device indicating that one of the input devices has been manually activated by a human user, then the security system enters an alarm state and sends an alarm message to the central monitoring station.

The security system may monitor the home automation system using any of a number of different methodologies. For example, in the case where the home automation system includes an input device wirelessly coupled to a controller incorporated into a controlled device, then the security system may simply monitor a frequency spectrum used by the home automation system for control messages from the input device intended for the controlled device. Upon detecting a manual input, the security system may automatically enter an alarm state.

Alternatively, a monitoring processor within the controller 34 of FIG. 1 may monitor the status of each of the input devices and update an input device file each time an input signal is received from an input device. Each time an input is received from a control input device, the monitoring processor may send a status message to a corresponding monitoring processor within the security system. Alternatively, the monitoring processor within the security system may periodically poll the monitoring processor within the home automation system for a status of each of the input devices.

In general, the system includes at least one security system sensor, at least one home automation device and a security system processor that monitors the security system sensor and generates an alarm upon activation of the at least one security system sensor. The security system processor also monitors the at least one home automation device and generates an alarm upon detecting the manual activation of the at least one home automation device.

Alternatively, the system includes a security system, at least one home automation device and a security system processor that monitors the home automation device and generates an alarm upon detecting the manual activation of the at least one home automation device.

Alternatively, the system includes a security system, at least one sensor of the security system, at least one home automation device and a security system processor that monitors the security system sensor and generates an alarm upon activation of the at least one security system sensor. The security system processor also monitors the at least one home automation device and generates an alarm upon detecting the manual activation of the at least one home automation device.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the FIGURES do not require the particular order shown, or sequential order, to achieve desirable results. Other steps may be provided, or steps may be eliminated, from the described flows, and other components may be add to, or removed from the described embodiments.

The invention claimed is:

1. A system comprising:
   at least one security system sensor in a security system;
   at least one home automation device;
   a security system processor, wherein the security system processor monitors the at least one security system sensor and generates an alarm upon activation of the at least one security system sensor, wherein the security system processor monitors the at least one home automation device and generates an alarm upon detecting a manual activation of the at least one home automation device, wherein the at least one home automation device further comprises a manually activated switch coupled to a home automation controller, and wherein the manually activated switch and the home automation controller further comprise a communication protocol operating under one of Z-wave, ZigBee, UPB, X10 and Insteon;
   a processor of the security system processor that polls the home automation controller for status; and
   a processor of the home automation controller that responds to the poll with notification of activation of the manually activated switch.

2. The system as in claim 1 wherein the at least one home automation device further comprises a light switch.

3. The system as in claim 1 wherein the manually activated switch and the home automation controller further comprise a wireless communication protocol.

4. The system as in claim 1 further comprising a processor of the home automation controller that sends status changes to the security system processor.

5. The system as in claim 1 further comprising a processor of the security system processor that logically ANDs the detection of the manual activation of the at least one home automation device with a status state of the security system.

6. The system as in claim 5 wherein the status state further comprises armed.

7. The system as in claim 1 further comprising a processor of the security system processor that sends an alarm message to a central monitoring station.

8. A system comprising:
   a security system;
   a plurality of home automation devices of a home automation system;
   a security system processor that monitors the plurality of home automation devices and generates an alarm upon detecting a manual activation of at least one of the plurality of home automation devices; and
   a transceiver within the security system that monitors a frequency spectrum used by the plurality of home automation devices for wireless messages transmitted by a user controlled input device to a controlled device of the home automation system.

9. The system as in 8 further comprising a controller of the home automation system and a plurality of user controlled input devices activated by human users of the home automation system, where each of the plurality of user controlled input devices corresponds to one of the plurality of home automation devices.

10. The system as in claim 9 further comprising a monitoring processor of the controller of the home automation system that monitors for messages from each of the plurality of user controlled input devices.

11. The system as in claim 10, further comprising a transceiver of the home automation system that transmits a status message to the security system each time a user controlled input device in the plurality of user controlled input devices is activated.

12. The system as in claim 10 further comprising a monitoring processor of the security system that polls the home automation system for a status of each of the plurality of user controlled input devices.

13. A system comprising:
a security system;
at least one sensor of the security system;
at least one home automation device of a home automation system;
a security system processor, wherein the security system processor monitors the at least one sensor of the security system and generates an alarm upon activation of the at least one sensor of the security system, and wherein the security system processor monitors the at least one home automation device and generates an alarm upon detecting a manual activation of the at least one home automation device; and
a transceiver within the security system that monitors a frequency spectrum used by the at least one home automation device for wireless messages transmitted by a user controlled input device to a controlled device of the home automation system.

14. A system as in claim 13 wherein the at least one home automation device further comprises a plurality of home automation devices monitored by the security system.

15. The system as in claim 14 wherein the plurality of home automation devices further comprises a central controller that monitors a status of each of the plurality of home automation devices for inputs from a respective user controlled input device activated by a human user.

* * * * *